United States Patent [19]
Garrett, Sr. et al.

[11] Patent Number: 5,515,285
[45] Date of Patent: May 7, 1996

[54] SYSTEM FOR MONITORING VEHICLES DURING A CRISIS SITUATION

[75] Inventors: Charles N. Garrett, Sr., Wilmington, N.C.; Anthony F. Garrett, Greer, S.C.; Brent W. Reed; William P. Lovegrove, both of Greenville, S.C.

[73] Assignee: Car Trace, Incorporated, Greenville, S.C.

[21] Appl. No.: 168,676

[22] Filed: Dec. 16, 1993

[51] Int. Cl.⁶ .................................................. B60R 25/10
[52] U.S. Cl. .......................... 364/460; 340/990; 340/426; 364/452
[58] Field of Search ...................... 364/449, 452, 364/450, 460, 457; 340/989, 990, 993, 438, 426; 342/357, 457; 180/287; 379/40, 44; 455/53.1, 54.1

[56] References Cited

U.S. PATENT DOCUMENTS

| | | | |
|---|---|---|---|
| 3,242,460 | 3/1966 | Morrell | 180/287 |
| 3,439,771 | 4/1969 | Commins | 180/287 |
| 3,553,641 | 1/1971 | Moragne | 180/287 |
| 3,646,515 | 2/1972 | Vodehnal | 180/114 |
| 4,067,411 | 1/1978 | Conley et al. | 180/287 |
| 4,095,229 | 6/1978 | Elliott | 343/715 |
| 4,112,421 | 9/1978 | Freeny, Jr. | 343/112 D |
| 4,157,547 | 6/1979 | Freimark et al. | 343/180 |
| 4,891,650 | 1/1990 | Sheffer | 342/457 |
| 5,032,845 | 7/1991 | Velasco | 342/457 |
| 5,155,689 | 10/1992 | Wortham | 364/460 |
| 5,218,367 | 6/1993 | Sheffer et al. | 342/457 |
| 5,223,844 | 6/1993 | Mansell et al. | 342/357 |
| 5,247,564 | 9/1993 | Zicker | 379/40 |
| 5,307,048 | 4/1994 | Sonders | 340/426 |
| 5,311,197 | 5/1994 | Sorden et al. | 342/457 |
| 5,334,974 | 8/1994 | Simms et al. | 340/990 |

OTHER PUBLICATIONS

Brochure, DeLorme Mapping, XMap Professional for UNIX, 1993, six pages.
Article (newspaper and date unknown), Firms Help in Fight Against Carjacking.
Brochure, LO JACK, Stolen Vehicle Police Recovery Network, Aug. 1993, 2 pages.
Article, The Wall Street Journal, Stop! Thief, Guard, Wayward Spouse, Etc., Dec. 7, 1993.
Seth Malgieri, RCR, Networks Licensed to Offer Vehicle Location, Mobile Data, Sep. 27, 1993.
Rikki T. Lee, Radio Resourse, Keeping Track of AVL Technology, Jan./Feb. 1993.
Roald Steen, GPS–based Vehicle Location Boosts Productivity, Safety, Mobile Radio Technology, Aug. 1993, pp. 10, 12, 14, 16, 18, 20 and 22.

*Primary Examiner*—Michael Zanelli
*Attorney, Agent, or Firm*—Dority & Manning

[57] ABSTRACT

A system for monitoring a vehicle experiencing a crisis situation, such as carjacking. Each vehicle to be monitored includes an on-board reporting apparatus. The reporting apparatus are operative during occurrence of the crisis situation to automatically initiate communication with a remote monitoring facility via a cellular telephone network. Selected status information will then be provided to the remote monitoring facility to permit real time tracking of the vehicle. As a result, law enforcement personnel may be contacted to effectively respond to the crisis situation. Preferably, the reporting apparatus further includes conspicuous alarm indicators, such as a siren and a strobe lamp.

18 Claims, 10 Drawing Sheets

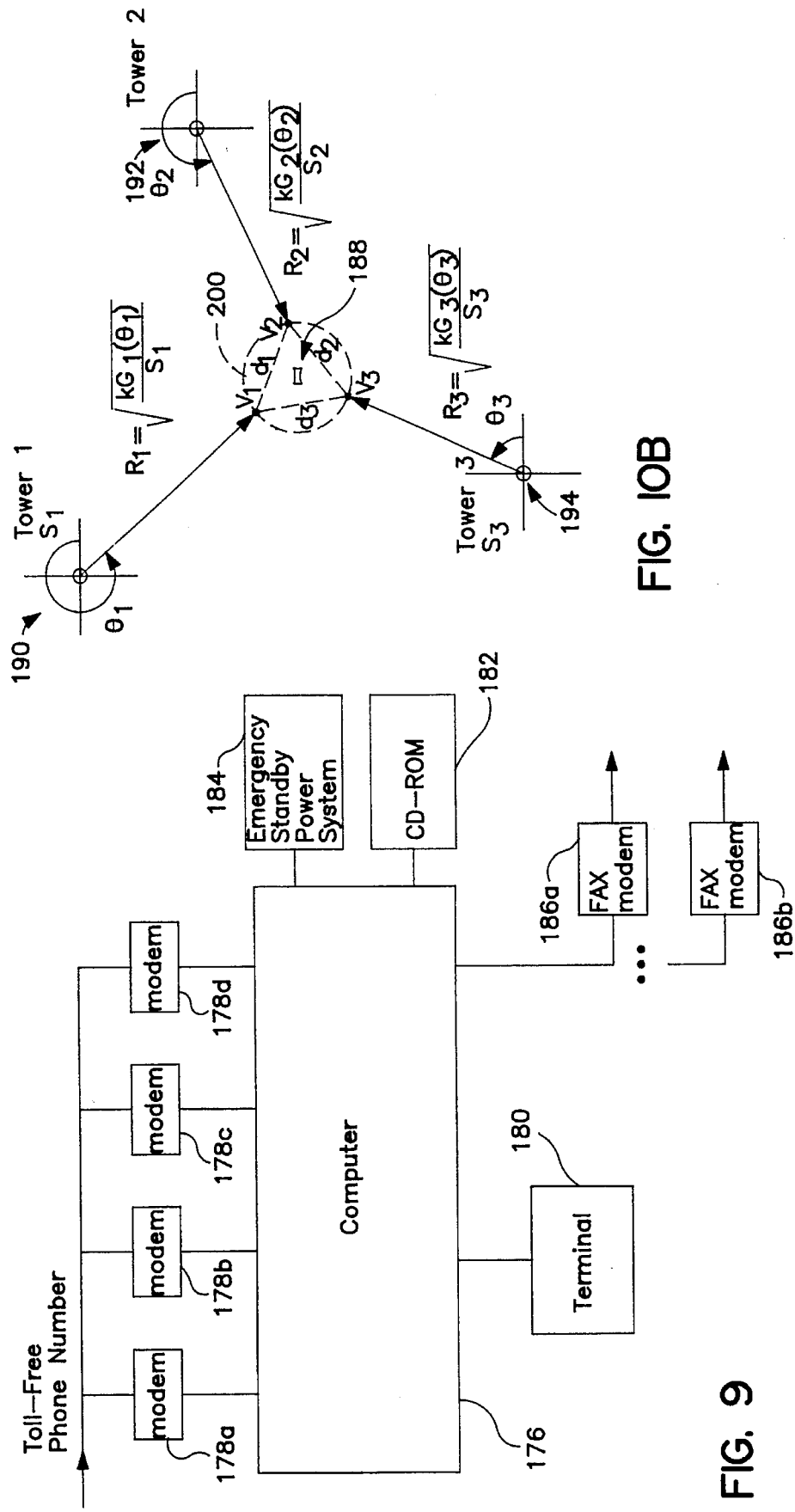

SYSTEM FOR MONITORING VEHICLES DURING A CRISIS SITUATION

BACKGROUND OF THE INVENTION

The present invention relates to a system for monitoring a vehicle during a crisis situation. More particularly, the invention relates to such a system which may facilitate the efforts of law enforcement personnel and the like to address the crisis situation.

Crimes involving motor vehicles are often bold and violent in nature. For example, in a "carjacking" situation, the assailant will forcibly enter the vehicle while the driver and any passengers are inside. Often, the assailant will then direct the driver to set the vehicle in motion under threat of physical harm. When this occurs, the vehicle may, in a matter of minutes, be many miles from the location of the original forced entry. Therefore, even if law enforcement personnel have been informed that the carjacking has taken place, they may be unaware of the current location of the vehicle. As such, it may be very difficult for them to effectively respond to the incident.

Various vehicle alarm systems have been provided in the past. Generally, such systems are concerned with preventing theft of the vehicle while it is parked. Often, this is accomplished by sounding a loud horn or other audible device when the attempted theft is detected. Examples of prior art vehicle alarm systems are shown in the following U.S. Pat. Nos.: 3,646,515 to Vodehnal, 3,553,641 to Moragne, 3,439,771 to Commins and 3,242,460 to Morrell. The vehicle alarm systems disclosed in each of these patents would be inadequate to address a crisis situation such as that described above.

U.S. Pat. No. 4,067,411 to Conley et al. discloses a vehicle emergency alarm and stop system. This system includes a concealed switch which, when actuated, causes transmission of an emergency condition message to a receiver located at a central station. A coded message may then be transmitted back to the vehicle so that it will be involuntarily retarded or stopped. A portable transmitter is also provided which can be carried by an authorized operator to remotely cause transmission of the emergency condition message. A microphone is also included to allow transmission of conversations occurring in the vehicle.

While the system disclosed in Conley et al. may offer some utility in a crisis situation, it suffers from a number of significant disadvantages. For example, it discloses no means to indicate the location of an affected vehicle. As a result, it may be very difficult for law enforcement personnel to quickly find the vehicle. Additionally, movement of the vehicle under duress can easily cause the range of the vehicle transmitter to be exceeded.

Various systems and devices have also been proposed to monitor the location of vehicles without regard to the problems raised by a crisis situation. One such system is disclosed in U.S. Pat. No. 4,112,421 to Freeny, Jr. In this system, a plurality of signpost units are placed at selected locations in a region which may be traveled by the vehicle. The respective signpost units emit a coded signal which is received by a vehicle unit. The strength of the coded signal can be used to determine whether the vehicle is within the near field or far field region. Adjacent signpost units broadcast distinguishable signals which can be used to determine that the vehicle is within an overlap region between the signals emitted by each. It can thus be seen that the ability of the system of Freeny, Jr. to locate the vehicle is generally dependent upon the spacing of the signpost units. Other prior art monitoring systems, of which the system of Freeny, Jr. is stated to be an improvement, are discussed generally therein.

SUMMARY OF THE INVENTION

The present invention recognizes and addresses the foregoing disadvantages, and others, of prior art systems for monitoring vehicles. Accordingly, it is an object of the present invention to provide an improved system for monitoring a vehicle during a crisis situation.

It is another object of the present invention to provide a vehicle monitoring system in which location of the vehicle is known at a remote monitoring site so that law enforcement personnel can be notified thereof.

It is a more particular object of the present invention to provide a vehicle monitoring system which utilizes a plurality of location determination techniques or devices to more accurately determine location of the vehicle.

It is another object of the present invention to provide a vehicle monitoring system having a virtually unlimited monitoring area.

It is a more particular object of the present invention to provide a vehicle monitoring system having a virtually unlimited monitoring area while simultaneously having a relatively low power on-board transmitter.

It is a more particular object of the present invention to provide a vehicle monitoring system including conspicuous vehicle alarm functions.

It is another object of the present invention to provide a novel method of determining the location of a vehicle.

Some of these objects are accomplished by a reporting apparatus carried on board the vehicle. The reporting apparatus includes input means for selectively denoting occurrence of the crisis situation. Location determination means are also provided to determine a current location of the vehicle. The input means and the location determination means are operatively connected to a system processor means, which initiates communication with a remote monitoring site via communicator means. In this manner, selected status information may be provided to the remote monitoring site. Such selected status information will include information indicative of the current location of the vehicle. Other information, such as vehicle make, model, color, license plate number and velocity, may also be provided.

The reporting apparatus on board the vehicle preferably communicates with the remote monitoring site via telephone. In this case, the communicator means includes a cellular telephone and other interfacing devices as may be necessary for this purpose. The use of such telephone communication provides a number of significant advantages, as will be described fully herein.

In presently preferred embodiments, the location determination means includes at least one receiver device operative to receive selected radio signals from which the location of the vehicle may be determined. The specific type of receiver device utilized will often depend on the exigencies of the particular application. Enhanced accuracy may often be achieved if a number of such receiver devices based on different positioning systems are utilized in combination. For some such receivers, the radio signal used to determine location may be received via the entertainment radio antenna of the vehicle, provided that a suitable signal splitter network is installed.

The location determination means may further include inertial means for producing selected inertial information from which the location of the vehicle may be determined. This inertial information may be provided during periods when accurate location information is otherwise unavailable. Such inertial means may be easily configured utilizing the combination of a magnetic compass having an electrical output and a vehicle speed transducer, each operatively connected to the system processor means.

In presently preferred embodiments, the reporting apparatus further includes alarm indicator means to conspicuously indicate occurrence of the crisis situation. The alarm indicator means, which may include a siren device and a strobe lamp, are selectively actuated by an alarm implemented by the system processor means. In many applications, it will be desirable for this alarm to have a first silent state and a second conspicuous state. While the selected status information is provided to the remote monitoring site during both such states, the alarm indicator means are actuated only during the conspicuous state. Additionally, stoppage means may be provided and actuated during the conspicuous state to facilitate stoppage of the vehicle. Preferably, the system processor means is further operative to implement the conspicuous state after receipt of a preselected alarm signal from the remote monitoring site.

Generally, the input means may include at least one panic actuator selectively actuatable to initiate the alarm states. Such a panic actuator may be configured as a panic button depressible a first time to initiate the silent state and depressible a second time to initiate the conspicuous state. Preferably, two such panic buttons are provided, one mounted on board the vehicle in a concealed location and the other included within a portable panic button device which may be carried on a key chain.

The reporting apparatus may further comprise intrusion detector means operatively connected to the system processor means for denoting unauthorized intrusion of the vehicle. Preferably, such intrusion detector means will include an ignition switch detector and an open door detector. An actuator mounted in the vehicle is provided to arm or disarm the intrusion detector means. If an intrusion is detected while the intrusion detector means are armed, the alarm will be implemented in the conspicuous state.

The facility at the remote monitoring site will preferably have a preselected telephone number which is automatically called when occurrence of the crisis situation has been denoted. Preferably, the remote monitoring facility includes a visual display device operative to display the location of the vehicle as within a graphical map-like representation, or "map image" of the surrounding area. In this manner, movement of the vehicle throughout such surrounding area may be easily tracked. Additionally, the remote monitoring facility may further include at least one facsimile modem to automatically transmit data representative of the map image to appropriate law enforcement personnel.

To generate the map image, data storage and retrieval means for maintaining appropriate map data will generally be provided at the remote monitoring facility. Preferably, such data storage and retrieval means is a compact disc read only memory ("CD-ROM") device, including a compact disc on which the map data has been encoded. Such compact discs have a relatively large storage capacity and may include map data representative of a large geographical area or many cities.

To further enhance accuracy in vehicle monitoring, the present invention provides a method whereby vehicle location may be determined at the remote monitoring facility. This method may be utilized in addition to, or in lieu of, location determination performed on board the vehicle. First, a gain pattern is determined for a plurality of cellular telephone receiver towers in a cellular telephone network servicing an area through which the vehicle is expected to travel. As the vehicle communicates with the remote monitoring facility, the field strength of the telephone signal carrier emanating from the vehicle is detected at three or more of the plurality of cellular telephone receiver towers. Based on the respective gain patterns and field strengths, respective direction vectors may be determined from the receiver towers to the vehicle. Because the locations of the receiver towers are known, the location of the vehicle may be ascertained. Preferably, the direction vectors are determined utilizing a numerical search method to find a minima of a squared sum of a distance between respective vector tips. Appropriate numerical search methods for this purpose include a gradient minimization method or a random search method.

BRIEF DESCRIPTION OF THE DRAWINGS

A full and enabling disclosure of the present invention, including the best mode thereof, to one of ordinary skill in the art, is set forth more particularly in the remainder of the specification including reference to the accompanying drawings in which:

FIG. 9 diagrammatically illustrates a presently preferred embodiment of a remote monitoring facility constructed in accordance with the present invention; and FIGS. 10A and 10B diagrammatically illustrate one method of determining the location of a vehicle in accordance with the present invention.

Figure 1:
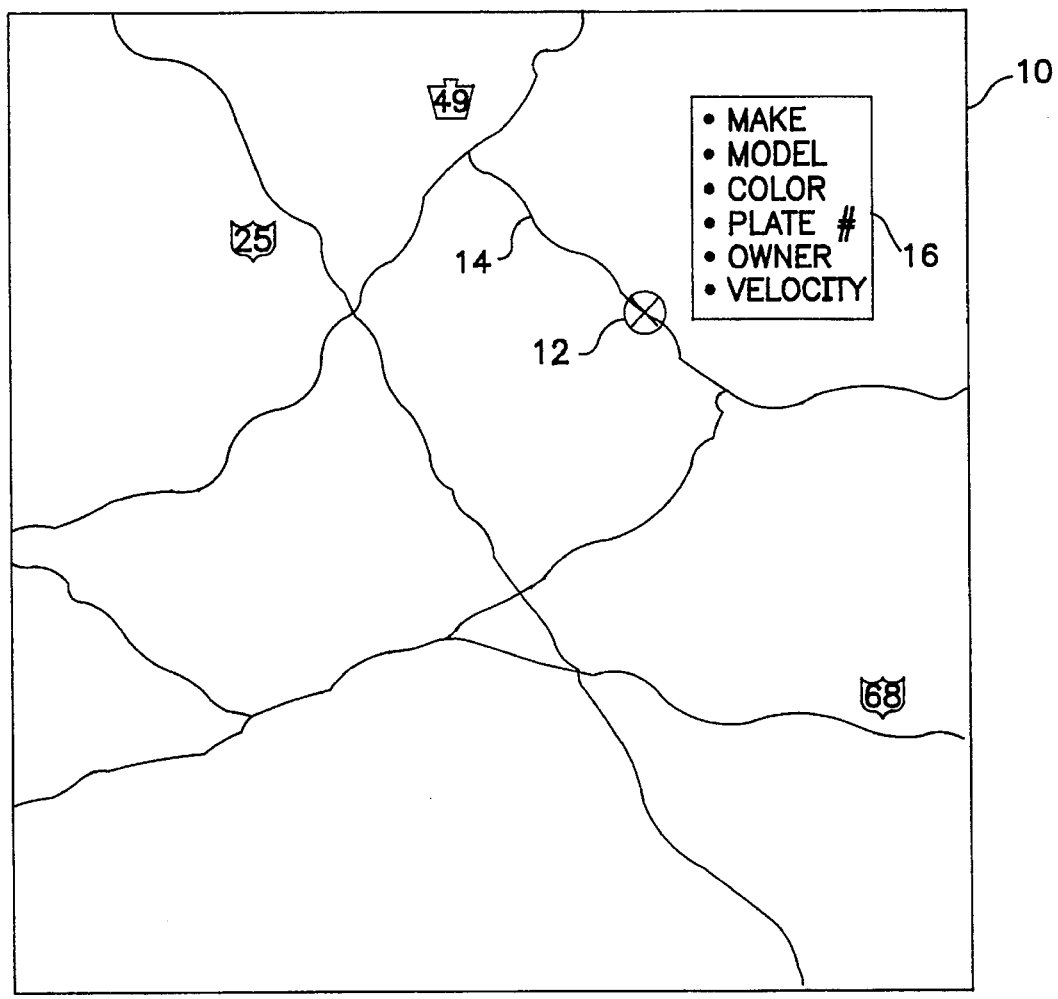
FIG. 1 illustrates a display of vehicle location during a crisis situation as within a graphical map image according to the teachings of the present invention.

Repeat use of reference characters in the present specification and drawings is intended to represent same or analogous features or elements of the invention.

DETAILED DESCRIPTION OF PRESENTLY PREFERRED EMBODIMENTS

Reference will now be made in detail to the presently preferred embodiments of the invention. Such embodiments are provided by way of explanation of the invention, which is not intended to be limited thereto. In fact, those of ordinary skill in the art may appreciate upon reading the present specification and viewing the present drawings that various modifications and variations can be made. For example, features illustrated or described as part of one embodiment can be used on another embodiment to yield a still further embodiment. Additionally, certain features may be interchanged with similar devices or features not mentioned yet which perform the same or similar functions. It is therefore intended that such modifications and variations are included within the totality of the present invention.

During a crisis situation, such as carjacking, it may not be desirable to aggravate an assailant at the moment his presence and intents are asserted. This is particularly true if the assailant is armed with a weapon of deadly force. Therefore, an unobtrusive and inobvious means of denoting occurrence of the crisis situation would be of great value. It is especially important to be able to denote occurrence of the crisis situation while the vehicle is in motion with the driver under duress of physical harm. Often, the driver may acquiesce in driving the vehicle for some distance in an attempt to prevent the assailant from becoming angry.

It can thus be seen that it is generally insufficient for law enforcement personnel to know only that a crime is progress. Even in the case of simple theft, it is often not sufficient to know only where the vehicle was last parked. In order to overcome these deficiencies, the present invention communicates more detailed information to the remote monitoring site, including information uniquely indicative of the vehicle and information regarding the current location thereof.

FIG. 1 illustrates a map image 10 such as may be displayed at the remote monitoring site during the crisis situation. In this case, the vehicle to be monitored is shown generally at 12. Various roads and highways along which vehicle 12 may travel are also displayed within image 10. As shown, vehicle 12 is here being tracked as it moves along a road indicated generally at 14. A "window" 16 within image 10 exhibits various other useful information. For example, it will generally be helpful to display information descriptive of vehicle 12. Such information may include make, model, color, plate number and vehicle owner. Information regarding the current velocity (including speed and direction) of vehicle 12 may also be provided.

Figure 2:
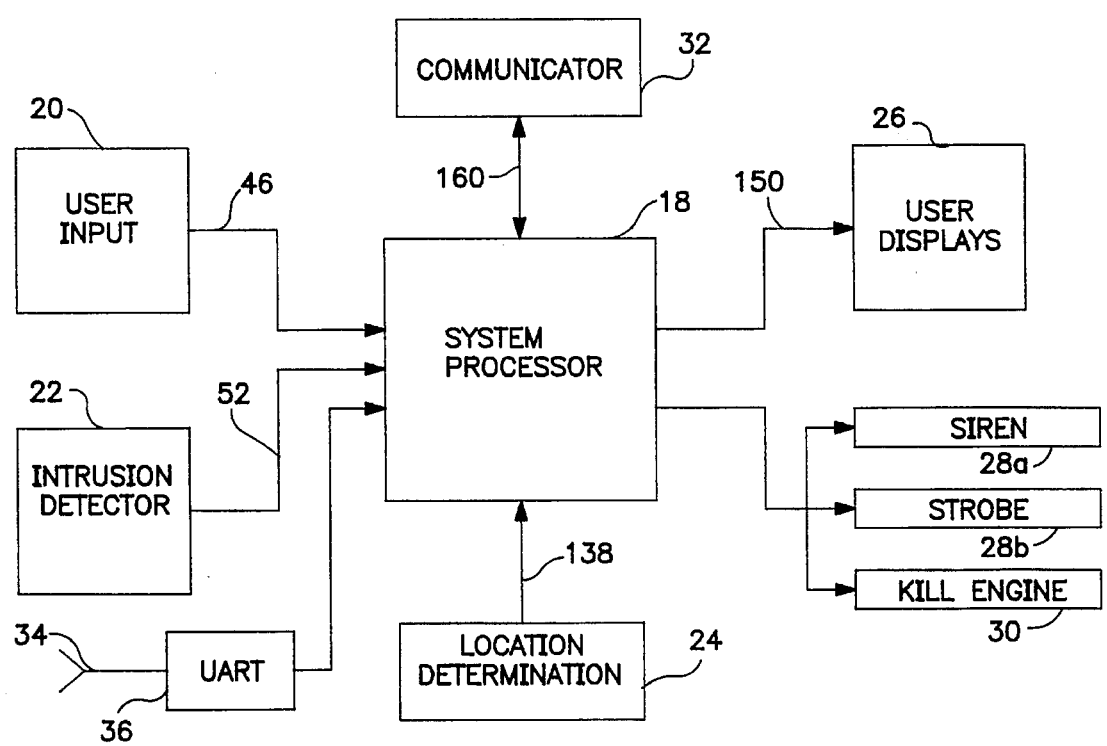
FIG. 2 is a diagrammatic representation of a presently preferred embodiment of an on board reporting apparatus of the present invention.

Vehicle 12 and other vehicles to be monitored according to the present invention are each equipped with an on-board reporting apparatus, a presently preferred embodiment of which is illustrated in FIG. 2. Such a reporting apparatus may be installed in the vehicle at the time of manufacture or may be added to the vehicle later as a retrofit. Except as may otherwise be necessary, it is contemplated that most of the components of the reporting apparatus will be hidden or concealed within the vehicle. This is to reduce the probability that a potential assailant may become aware of the presence of the reporting apparatus and thus try to defeat its operation.

As shown, the reporting apparatus preferably includes a system processor 18. Because processor 18 provides operative coordination between a number of peripheral devices, it may be thought of as the functional "heart" of the reporting apparatus. In presently preferred embodiments, processor 18 comprises an appropriately programmed digital microprocessor. For example, a Motorola 6811 microprocessor or a Intel 80188 CX microprocessor are believed suitable for some embodiments of the reporting apparatus. It should be appreciated, however, that other types of circuitry or processors may also be used to achieve similar results. Additionally, while processor 18 is shown connected to the various peripheral devices by a single line, such connection is diagrammatic and for purposes of illustration only. It will therefore be apparent that connection may often be by more than one electrical line, depending on the requirements of processor 18 or the particular peripheral device.

Among the peripheral devices operatively connected to processor 18 are various user input devices indicated generally at 20. Intrusion detector devices may also be provided, as indicated generally at 22. Various location determination devices, as indicated generally at 24, are also preferably provided. User displays, as indicated generally at 26, are provided to present the user with visual indications of the current operating conditions of the reporting apparatus. Indicator devices, such as siren device 28a and strobe lamp 28b, are included to conspicuously indicate occurrence of the crisis situation to persons near the vehicle. A stoppage device generally indicated at 30, such as a relay operatively connected within the vehicle ignition system, may also be provided to selectively effect stoppage of the vehicle. A communicator, generally indicated at 32, is included to facilitate communication of processor 18 with the remote monitoring site.

A maintenance terminal, as shown generally at 34, may also be provided so that selected information may be entered into processor 18 such as at the time the reporting apparatus is installed in the vehicle. Such information may include the following: (1) a unique serial number; (2) a description of the vehicle (e.g., make, model, body style and color, manufacturer serial number); (3) vehicle license number (including state); (4) the vehicle owner's name, address and telephone number; (5) next of kin contact information; (6) information regarding the particular hardware configuration of the reporting apparatus; and (7) the approximate location of the vehicle at the time of installation. Additionally, port 34 may serve as an input for diagnostic software utilized to test the operating condition of the reporting apparatus. As can be seen, a universal asynchronous receiver/transmitter ("UART") 36 may be serially connected between port 34 and processor 18 to facilitate effective transfer of information. Similar UART devices may be utilized as needed between processor 18 and the various peripheral devices.

Although not explicitly shown in FIG. 2, an appropriate power supply is also provided for the reporting apparatus. Generally, the +12 V battery bus of the vehicle will be utilized to provide the necessary voltage levels. Preferably, however, a separate twelve volt storage battery will also be provided to allow operation if the vehicle battery is removed in an attempt to disable the reporting apparatus. This separate battery may be a smaller gel cell battery which is hidden in the vehicle. This smaller battery may be charged by the vehicle charging system, but a diode should be included so that this smaller battery will not backfeed supply the vehicle if the vehicle battery has been removed.

In presently preferred embodiments, processor 18 is operative to selectively implement an alarm having a first silent state and a second conspicuous state. When the silent state is initiated, processor 18 will begin communication with the remote monitoring site. The identifying information programmed into processor 18, along with the location information, is then provided to the remote monitoring site via communicator 32. In this manner, it is possible to track the vehicle during the crisis situation without alerting the assailant.

During the conspicuous state, communication of tracking information will continue, but siren device 28a and strobe lamp 28b are also actuated. If desired, siren device 28a may generate three short high frequency bursts separated by a longer pause. This is the pattern of the letter "s" in Morse Code: dit-dit-dit . . . dit-dit-dit. The same pattern may also be presented by strobe lamp 28b. Additionally, initiation of the conspicuous state causes actuation of stoppage device 30. While a two state alarm will generally be preferred, it should be appreciated that a reporting apparatus having only one of a silent state or a conspicuous state is also contemplated within the scope of the present invention.

Figure 3:
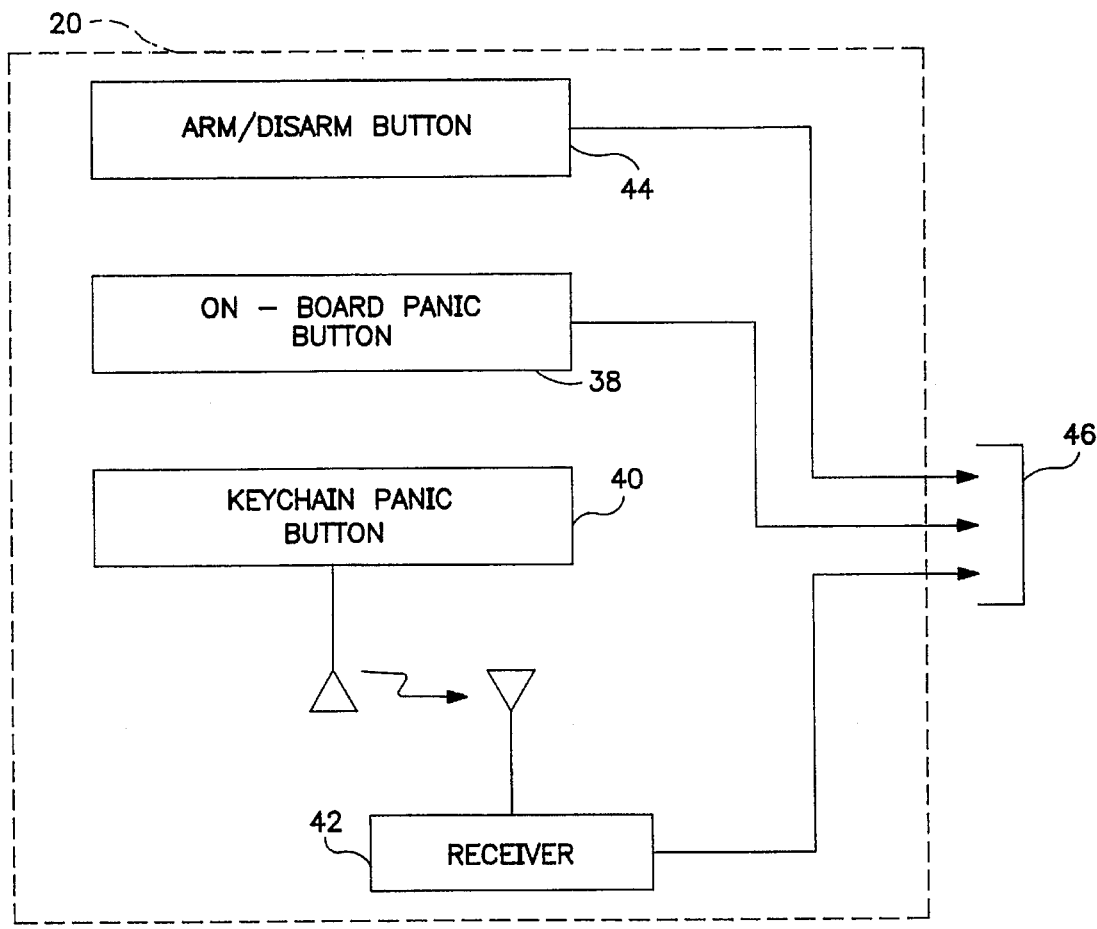
FIG. 3 is a diagrammatic representation of presently preferred user input devices which may be utilized by the reporting apparatus of FIG. 2.

The various user input devices collectively referenced as 20 are shown more clearly in FIG. 3. Such devices include a panic button 38 which is preferably mounted in a concealed location on the vehicle. This concealed location should be within easy reach of the vehicle driver, such as on or near the steering column. Depressing panic button 38 a first time will denote occurrence of the crisis situation and place the alarm implemented by processor 18 into the silent state. A second depression of panic button 38 will place the alarm in the conspicuous state.

A second panic button may be implemented on a portable device 40, which may be easily sized and configured to serve as an ornament carried on a key chain. Device 40 is in operative communication with a hidden receiver 42 on board the vehicle to denote a crisis situation in a similar manner to panic button 38. Preferably, portable device 40 is designed to minimize accidental triggering by spurious radio frequency ("RF") signals which may have been emitted from other sources on the same frequency. Toward this end, presently preferred embodiments utilize a spread spectrum modulation technique to carry a unique digitally encoded signal with an error detection scheme built in.

Figure 8:
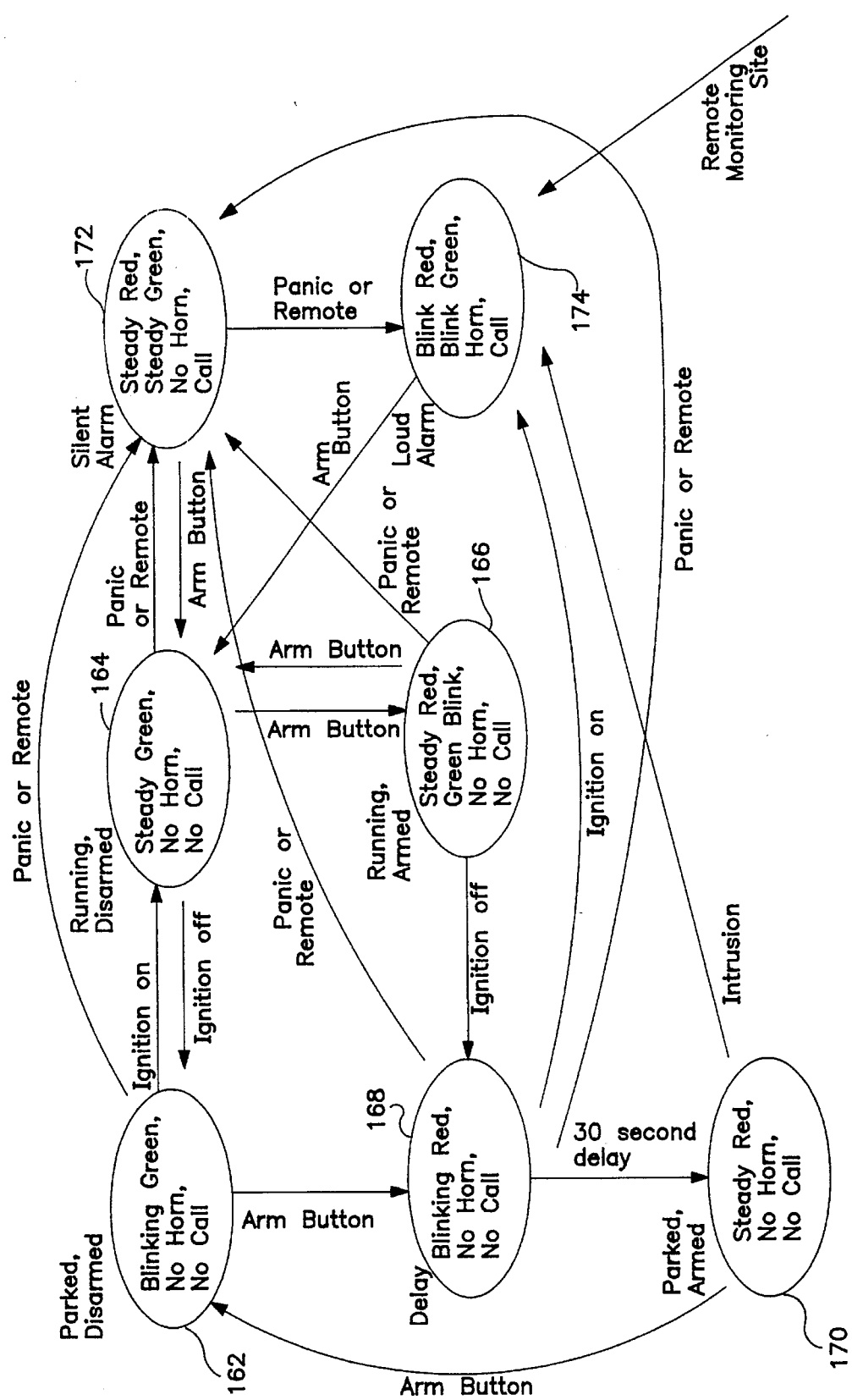
FIG. 8 is a state diagram illustrating operation of a two state vehicle alarm which may be implemented by the system processor of the reporting apparatus shown in FIG. 2.

An arm/disarm button 44 is also provided to selectively arm and disarm the alarm as will be described more fully below with reference to FIG. 8. The outputs of button 38, receiver 42 and button 44 are collectively fed to processor 18 as indicated at 46.

Figure 4:
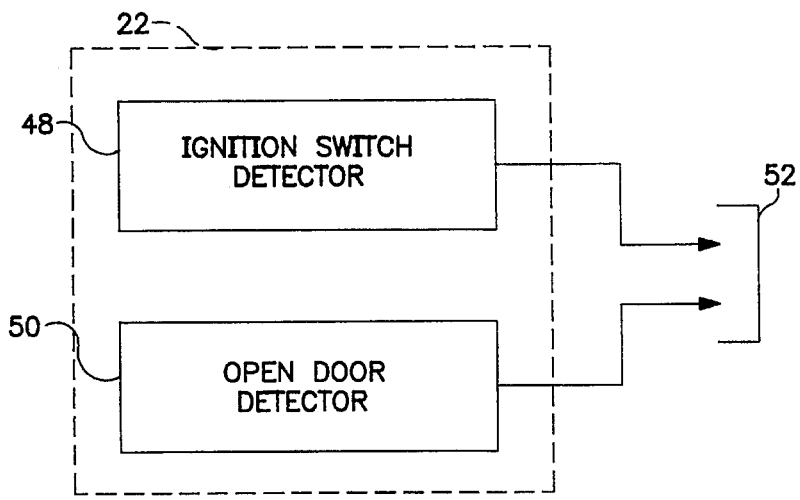
FIG. 4 is a diagrammatic representation of presently preferred intrusion detector devices which may be utilized by the reporting apparatus of FIG. 2.

The intrusion detector devices collectively referenced as 22 are shown more clearly in FIG. 4. Specifically, presently preferred embodiments utilize an ignition switch detector 48 and an open door detector 50. The ignition switch detector 48 indicates that an attempted actuation of the vehicle ignition switch has occurred. Open door detector 50 indicates that one of the vehicle doors has been opened. Open door detector 50 may comprise, for example, parallel switches on each of the vehicle doors or a sensor to detect current in the dome light circuit. The respective outputs of ignition switch detector 48 and open door detector 50 are fed to processor 18 as collectively referenced at 52. Although not explicitly shown, other appropriate detectors, such as door switch detectors, may also be provided.

Figure 5A:
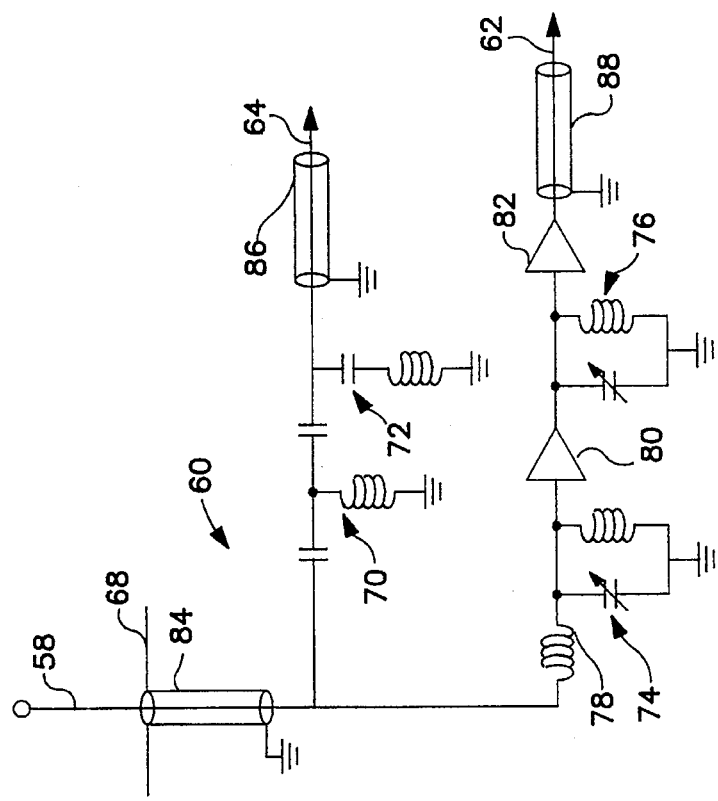
FIG. 5A is a schematic diagram of the diplexer shown generally in FIG. 5.
Figure 5:
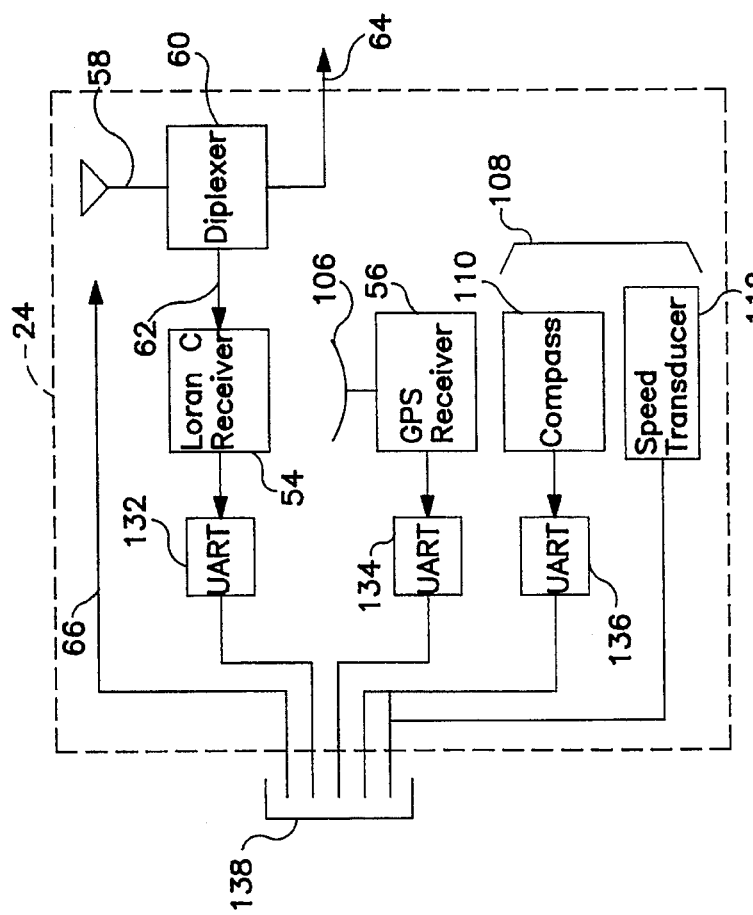
FIG. 5 is a diagrammatic representation of location determination devices which may be utilized singularly or in various combinations by the reporting apparatus of FIG. 2.

Referring to FIG. 5, the various position determination devices referred to collectively as 24 may be most easily understood. In order to enhance reliability and accuracy, presently preferred embodiments of the invention utilize various combinations of several different location determination technologies. The particular combination of technologies used in a specific vehicle will often depend upon exigencies such as geographical location and typical routes of travel. Regardless of the particular technology utilized, however, location will generally be determined continuously as the vehicle is in motion. When the vehicle comes to rest, data of the "last good position" is stored in processor 18.

Many presently preferred embodiments of the reporting apparatus utilize at least one receiver device operative to receive selected radio signals from which location of the vehicle may be determined. Such radio signals may be produced by one of the radio-based navigational systems which are installed in various regions around the world. Toward this end, the embodiment illustrated in FIG. 5 includes a Loran receiver 54 and a GPS receiver 56.

Loran (LOng-RANge) C is a land-based surface navigation aid designed to be used by ocean going vessels to perform accurate navigation in coastal waterways. This system includes chains of transmitters which transmit precision timing signals. These timing signals are then received by receivers on the vessels. The position of the receiver in relation to the transmitter locations may then be determined by comparing the timing signals using triangulation methods. Recently, several Loran chains have been added to facilitate aircraft navigation anywhere within the continental U.S. Additionally, chains have also been added in Europe and other coastal areas around the world.

A simple Loran receiver is able only to measure differential times, and consequently is unable to directly measure location. Receiver 54 may be of this type, which will frequently have a digital serial output. In this case, the absolute location coordinates will be calculated within processor 18. Some modern Loran receivers, however, include a memory having the locations of the transmitter chains programmed therein. With such a receiver, an internal microprocessor may be included to directly output the location coordinates. A receiver which is suitable for this purpose is the Micrologic SuperSport Loran C receiver.

The GPS ("Global Positioning System") is a joint military and commercial navigation system designed and placed in position by the United States Government. A GPS receiver, such as receiver 56, obtains data from Navstar satellites in polar orbits high in space. These satellites carry precise timing standards and complex computer systems which feed the radio transmitters on board. The data from these satellites is used in a manner somewhat similar to Loran C with some differences. Specifically, the relative distances from the satellites to the receiver are measured by comparing the clock data from each satellite. With four satellites, it is possible to compute a three-dimensional position. At present, there are enough Navstar satellites in orbit to ensure that there are at least four satellites in view to receivers located anywhere in the world.

It is contemplated that receiver 56 will be similar to the handheld commercial GPS receivers which are currently available. Such receivers are often used by surveyors, oil drillers and even wilderness hikers to accurately determine location. Preferably, receiver 56 will output absolute coordinate information to processor 18, although this may not necessarily be the case. A receiver which is suitable for this purpose is the Micrologic Supersport GPS receiver.

It should be noted that the European Economic Community ("EEC") is currently funding the development of a satellite based positioning system which is similar to GPS. It is therefore intended that the term "Global Positioning System" as used herein includes this EEC system and any other satellite-based system which may later be implemented. Additionally, this term is intended to include a differential GPS system in which satellite-based transmitters are utilized in conjunction with land-based transmitters to very accurately calculate receiver location.

Although not explicitly shown in FIG. 5, it is also contemplated that embodiments of the invention may be constructed utilizing other radio-based navigation systems. One other such radio-based navigation system is the VOR ("VHF OmniRange") system. VOR receivers are generally standard equipment in aircraft equipped for instrument flight. They function to receive a direction vector to the transmitter location. Using two VOR transmitters, position may be determined by simple resection.

When VOR is utilized, processor 18 should be programmed with the locations and operational frequencies of all VOR transmitters. The continental United States is well covered with VOR transmitters, so that good reception should be available in all major cities and near all major airports. VOR transmitters are not extremely high power, however, and ground reception may be marginal in rural areas.

Receipt of navigational radio signals requires that the respective receivers each have an appropriate antenna. It is important, however, that a would-be assailant not be alerted to the possible presence of a sophisticated monitoring system by numerous or unusual antennas on the vehicle. A carjacker, for example, may be expected to break off any antenna associated with a system which could be used to notify law enforcement personnel of the crime. In this regard, receiver 54 may receive the Loran C signals via the entertainment antenna 58 already on the vehicle. Toward this end, a diplexer network 60 is electrically connected interposing receiver 54 and antenna 58. A receiver utilizing the VOR system may receive the radio signals via entertainment radio 58 in a similar manner.

Diplexer network 60 functions as a signal splitter to properly route the Loran C signals to receiver 54 along line 62 and the entertainment signals to the vehicle's AM/FM radio along line 64. If antenna 58 is a power antenna which lowers when the ignition is off, it should be rewired to be controlled by processor 18. In this case, antenna 58 should be raised when the vehicle is started whether or not the AM/FM radio is on, and should be left up when the vehicle is parked until a reliable position has been stored. This control of antenna 58 by processor 18 is diagrammatically represented by line 66.

Diplexer network 60 is schematically illustrated in FIG. 5A. Antenna 58 is there shown extending from the vehicle body 68. Generally, Loran C signals are transmitted at a frequency of approximately 100 kHz. Because this is much lower in frequency than the AM or FM bands, the Loran C signals are easily separated therefrom. In presently preferred embodiments, network 60 is configured to split signals above and below a frequency of approximately 200 kHz. In this regard, a pair of LC networks 70, 72 are electrically connected interposing antenna 58 and line 64. Similarly, a pair of parallel resonant LC networks 74, 76 are connected interposing antenna 58 and line 62. Additionally, a serial inductor 78 is inserted in the lower frequency path to block the higher frequency AM/FM signals. Amplifier stages 80, 82 may also be provided to boost the Loran C signals fed to receiver 54. In presently preferred embodiments, amplifier stages 80, 82 each contribute approximately 20 dB of amplification. As shown, antenna 58, line 62 and line 64 are shielded and grounded to the vehicle chassis as respectively shown at 84, 86, 88.

Figure 5B:
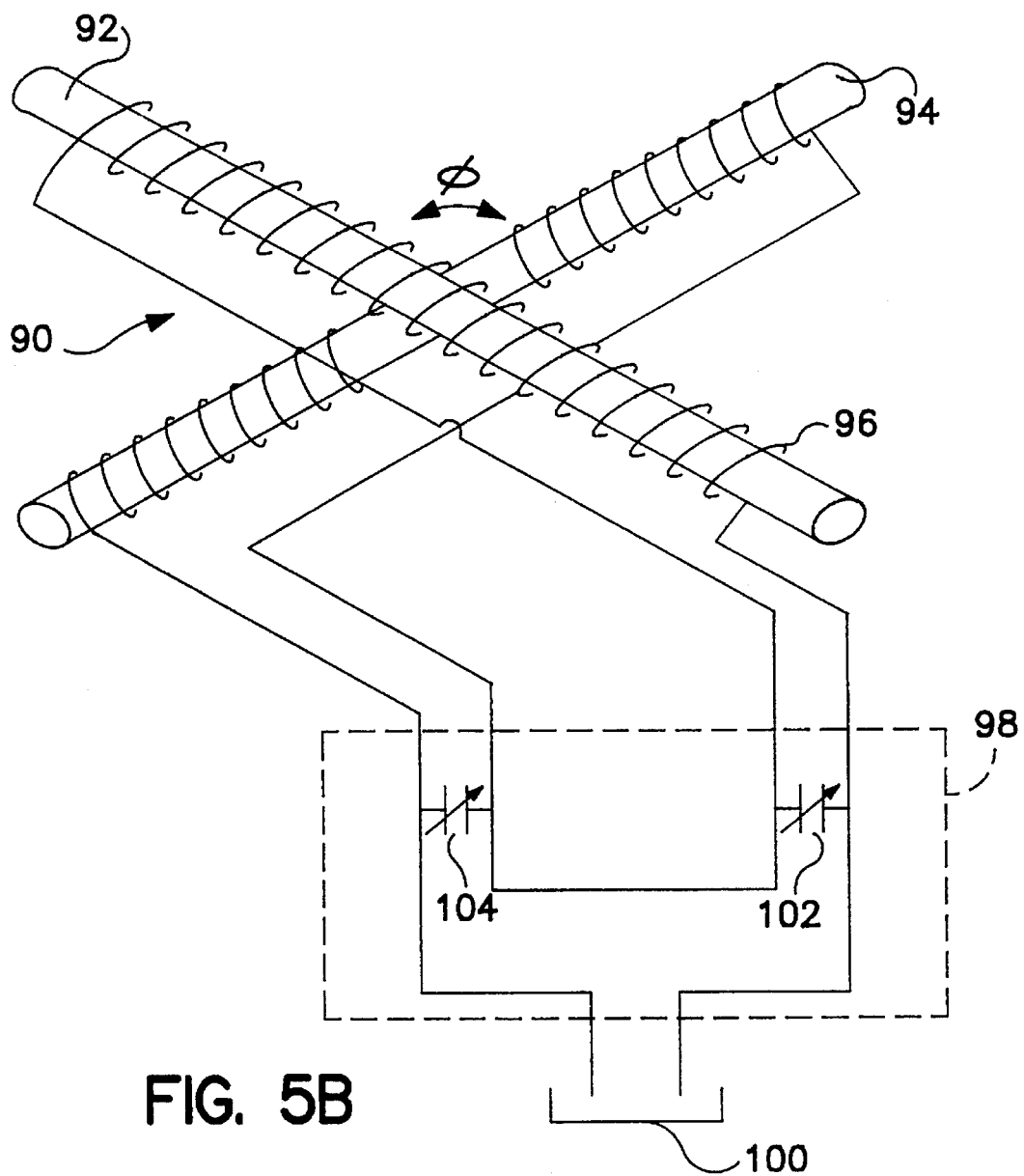
FIG. 5B is a schematic diagram illustrating a presently preferred antenna for receiving some types of radio signals from which location of the vehicle may be determined.

Loran signals may also be received via a small hidden antenna mounted on the vehicle. Such an antenna may utilize ferrite coils similar to the small antennas used in handheld portable radios. The ferrite material has magnetic properties, which cause the received signal's magnetic field to be concentrated in greater strength than in open air. A limitation, however, of a typical single ferrite rod structure is directionality. Particularly, such an antenna is most sensitive in the axial direction and has very poor reception when the transmit station is positioned perpendicular to the cylindrical axis of the rod. However, as shown in FIG. 5B, an effective and compact Loran antenna 90 may be constructed utilizing two such ferrite rod antennas mounted in a horizontal plane. Specifically, antenna 90 includes two ferrite rods 92, 94 placed at right angles, as indicated by angle $\phi=90°$. Rods 92, 94 have high magnetic permeability and are preferably low loss at 100 kHz. As shown, rods 92, 94 are wrapped by a number of turns of Litz wire 96.

The outputs of the two antennas collectively forming antenna 90 are combined by a combining network 98 before being passed to receiver 54 as indicated at 100. Because the wavelength of the Loran C signal is relatively long, the fields received by the two antennas will be substantially in phase with each other. As a result, the design of the combining network 98 may be a relatively simple series connection. Additionally, capacitors 102, 104 are added to tune the outputs of the two antennas to 100 kHz. Such an antenna may be mounted, for example, under the deck behind the back seat of the vehicle.

Referring again to FIG. 5, receiver 56 will utilize a microwave antenna 106 to capture the microwave signals emitted by the Navstar satellites. Because of the high frequencies, antenna 106 may be made relatively small. For example, while a larger antenna may be more impervious to noise and interference, a very small disc antenna of only three inches in diameter will generally achieve excellent reception when the full sky is in unobstructed view. Such an antenna may be easily disguised or hidden below any low loss dielectric material.

Antenna 106 should preferably be mounted to have a wide panoramic view of the sky. In a retrofit application, antenna 106 may be mounted behind the rear seat with a view upward out of the rear window. Antenna 106 may also be mounted on the vehicle's dashboard or externally on a bumper. Although it may not always be possible to view the entire sky with an antenna mounted in this manner, it is still possible in many circumstances to obtain position data with a partial view of the sky using diffracted signals. Such an antenna may also be installed at the time the vehicle is manufactured by flush mounting in the vehicle's roof. In this case, the antenna would be able to easily achieve a horizon-to-horizon view of the sky.

As discussed above, the reporting apparatus may utilize one or more receivers to facilitate determination of vehicle location by receipt of selected radio signals. In fact, it is contemplated that any navigational aid having a clearly defined interface and data format may be used to provide location data to processor 18. To achieve the greatest possible accuracy, processor 18 is further operative to determine an optimum estimate of the true location of the vehicle based on the data provided by these various devices.

As discussed above, processor 18 stores data representative of a reliable position when the vehicle is parked. When the vehicle is again set in motion, radio-based devices, such as receivers 54 and 56, will attempt to correctly synchronize with the transmitter signals. The period before such synchronization is achieved may be referred to as a "lock-up" period. In the case of receiver 54, for example, a typical duration of this initial lock-up period is approximately five minutes or more even with good signal strength conditions. Additionally, in some regions, the signal strength of the Loran C signals will be relatively low. As a result, a low signal-to-noise ratio can be expected within receiver 54. This may cause the lock-up period to be further extended. In fact, in some cases, the receiver may lose lock completely and not be able to continue reporting location. Additionally, signal fading is affected by structures such as overhead power wiring which may be incidentally tuned to the Loran C frequency. Furthermore, receiver 54 may be affected by multipath distortion resulting from the combination of the direct radiation from a Loran C transmitter with a delayed image signal which has been reflected from a structure. This may cause errors in the location reported by receiver 54. While the initial lock-up period will generally be shorter with receiver 56, a typical duration of thirty seconds to two minutes may be expected. Even during the shorter period, a vehicle can travel a considerable distance.

In order that location can be calculated when accurate position data is not available from receivers 54 and 56, the reporting apparatus may further include inertial devices. High precision inertial navigation systems are typically found only in large commercial aircraft and on military planes and ships. These systems are very complex and quite expensive. They use precision gyroscopes rotating in quadrature planes. The acceleration of the inertial platform is constantly measured in terms of minor rotational velocity changes of the gyroscopes which are in turn mathematically integrated twice to obtain velocity and displacement data. Once the system is initialized with an accurate starting position and velocity, an inertial navigation system provides very accurate three-dimensional position data relative to the initialization.

A high precision inertial navigation system of the type used on aircraft and ships would generally be considered prohibitively expensive for use in a private vehicle. In accordance with the present invention, however, an adequate inertial system may be installed in a vehicle at very low cost. This system, collectively referenced as 108, includes only two components: a magnetic compass 110 and a speed transducer 112. Compass 110 is preferably of the type which outputs direction information in digital form. Speed transducer 112 may be a digital wheel tachometer operatively connected to the vehicle drive shaft. The direction information provided by compass 110 is combined within processor 18 with the speed information provided by transducer 112 to determine the velocity vector. The velocity vector is then integrated in real time to determine relative displacement from an initialization location. This initialization location will be the last good location provided by the radio-based devices. Each time a good radio location fix is obtained, it may be used to reinitialize the inertial computations which will slowly accumulate error.

Figure 5C:
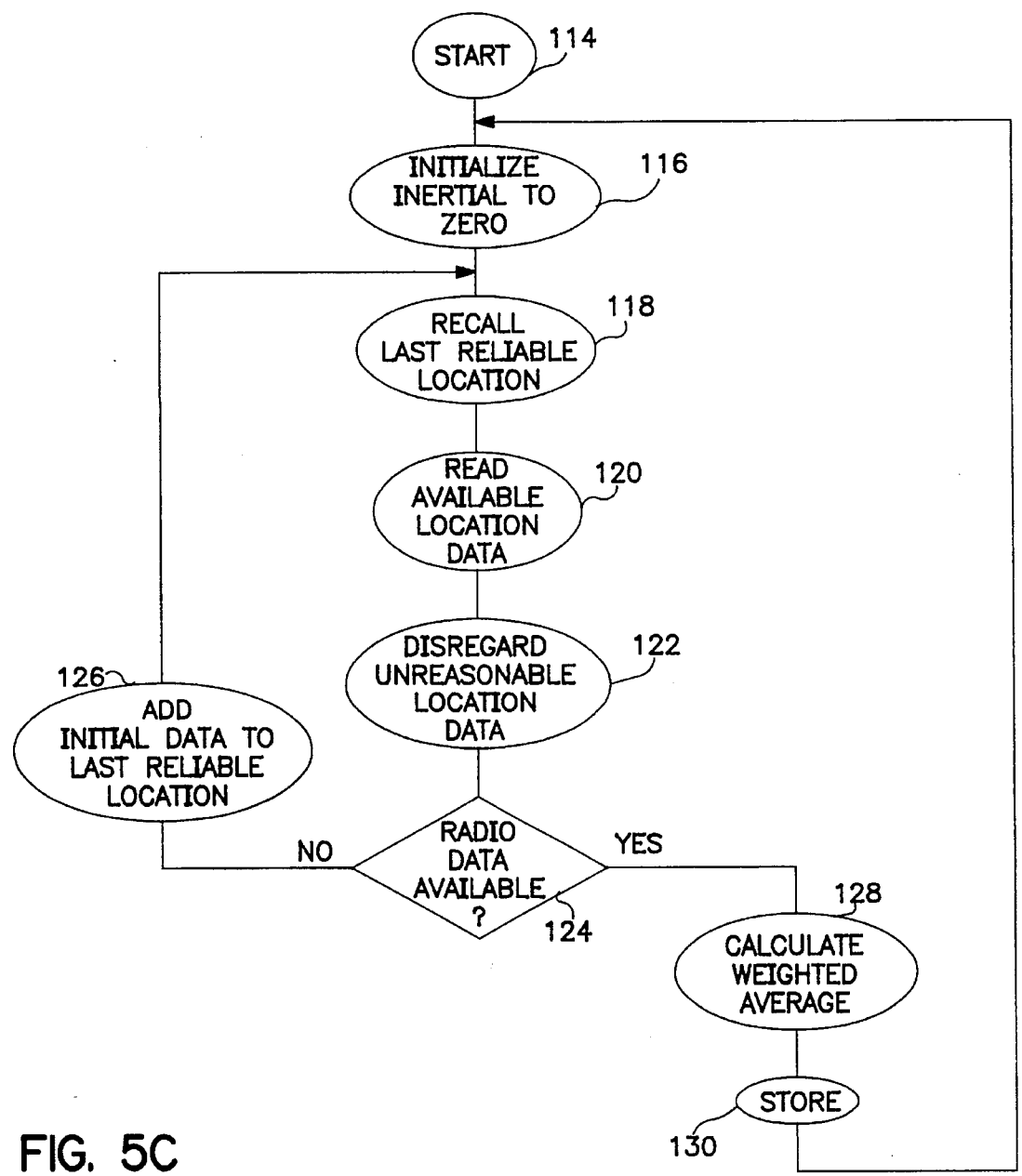
FIG. 5C is a flow diagram illustrating an algorithm which may be performed by the system processor of the reporting apparatus shown in FIG. 2 to determine location of the vehicle.

A preferred algorithm implemented by processor 18 to compare various location data provided by receivers 54, 56 and inertial system 108 is illustrated in FIG. 5C. The algorithm starts as indicated at oval 114. Next, as shown at oval 116, location as determined from information provided by inertial system 108 is initialized to zero. The last reliable location as stored by processor 18 is next recalled, as shown at oval 118. As indicated at oval 120, processor 18 next reads all available position data from the various location determination devices. Next, as shown at oval 122, the location data read from the various location determination devices are compared and any unreasonable location data is disregarded. Such location data is deemed to be unreasonable if it falls outside measurement error from the last reliable location.

As shown at block 124, the algorithm next branches depending upon whether location data is available from either of receivers 54, 56. If such radio data is not available, current location is determined by adding inertial data to the last reliable location, as indicated at oval 126. If such radio data is available, however, inertial data is preferably excluded. In this case, as shown at oval 128, a weighted average of all trustworthy position measurements (excluding inertial data) is calculated. The respective weights are assigned according to the estimated reliability and expected errors of the particular location determination device. This weighted average can be thought of as a new "last reliable location" and is therefore stored by processor 18, as indicated at oval 130. The algorithm is then repeated in a cyclical manner as shown.

Depending on the particular devices used, it may be necessary to provide one or more UARTs. For example, receiver 54, receiver 56 and compass 110 are respectively shown having UARTs 132, 134, 136 associated therewith. The collective interconnection between the devices 24 and processor 18 is indicated at 138.

Figure 6:
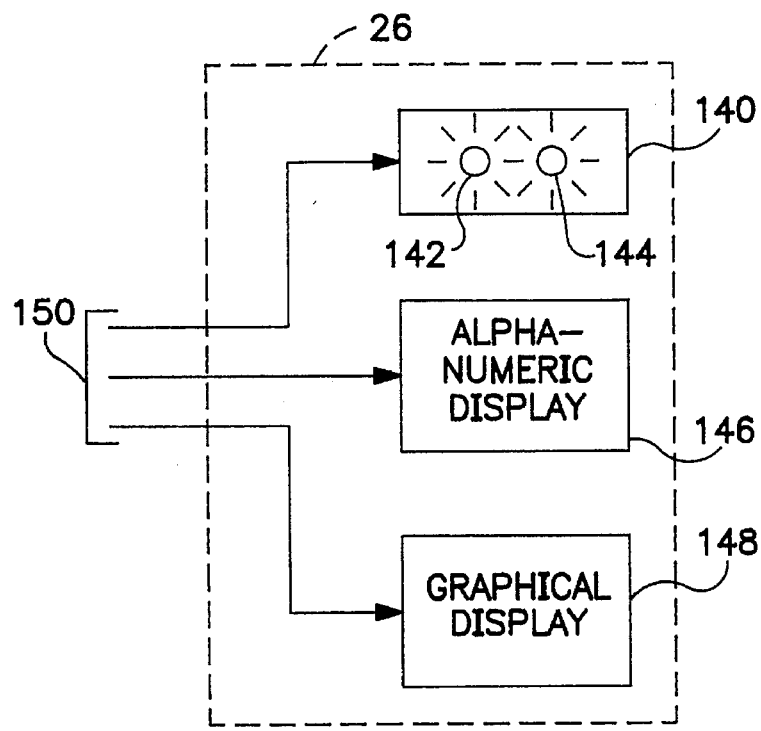
FIG. 6 is a diagrammatic representation of presently preferred user display devices which may be utilized by the reporting apparatus of FIG. 2.

The user displays collectively referenced as 26 are more clearly shown in FIG. 6. In presently preferred embodiments, these include a small lamp display 140 which is mounted on the vehicle dashboard in an inconspicuous position easily viewable only by the driver. Display 140 includes a pair of small light emitting diodes ("LEDs") 142, 144 which are preferably of different colors. For example, LED 142 may be red, with LED 144 being green. The operating status of the reporting apparatus may be indicated by various states of illumination of LEDs 142, 144 as will be explained more fully below with respect to FIG. 8.

More sophisticated displays may also be included, such as alphanumeric display 146 and graphical display 148. Typically, alphanumeric display 146 will be configured to provide the following information: (1) vehicle location coordinates; (2) alarm state in cryptic form; and (3) communication status. Graphical display 148 shows vehicle location on a map image, much like the image 10 which may be seen at the remote monitoring site. The interconnection between processor 18 and the user display devices 26 are collectively referenced as 150.

Preferably, display 148 is a color graphics display in which various options are selectable by a touch screen menu method. In embodiments where display 148 is provided, it will generally be necessary for processor 18 to be more powerful than would otherwise be the case. Thus, the specific microprocessors indicated above may not be adequate for this purpose.

Figure 7:
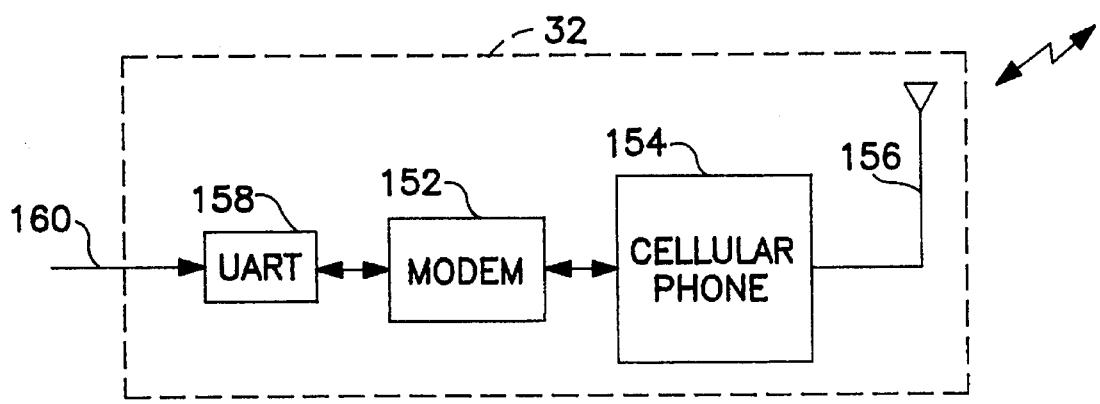
FIG. 7 is a diagrammatic representation of a presently preferred communicator which may be utilized by the reporting apparatus shown in FIG. 2.

Referring to FIG. 7, the preferred instrumentalities of communicator 32 will be described. As stated above, prior art monitoring systems have often been limited to a relatively small monitoring area. To increase this monitoring area, prior art systems have often resorted to increasing the power of the on board transmitters. To overcome these deficiencies, the present invention utilizes telephone communications to the remote monitoring site. A cellular telephone grid is already in place in nearly every large population center in America and western Europe. Additionally, a telephone system based on a hybrid of cellular and satellite technologies, known as Iridium, has been proposed and is expected to be implemented in the near future. A telephone system may also be based primarily on satellite technology. Telephone systems of any of these types should be fully compatible with the present invention. As such, it will not be necessary to provide a particular infrastructure in order to make the monitoring system of the invention operative.

Such telephone communications provide the reporting apparatus with the capability of situating the remote monitoring site virtually anywhere in the world. Also, the power levels of the signal emanating from the vehicle will generally not be so great as to interfere with other electronics thereon, such as fuel injection or ignition systems. Cellular communications are also generally more reliable than forms of typical radio communication. UHF cellular communications are by nature short distance links as opposed to VHF and HF links which may be much more distant, but suffer from the disadvantages of atmospheric fading, sunspot disruptions, and the need for much larger and harder to conceal antennas.

Toward this end, communicator 32 preferably includes a modem 152, cellular phone 154, and a suitable antenna 156. Preferably, modem 152 is a high noise immunity modem which will not drop carrier detect despite relatively high noise levels. Telephone 154 may be installed as a normal car telephone or a separate telephone hidden in the vehicle, such as under the seat. This latter option will often be preferred because an assailant may remove or damage a car telephone which is evident. Similarly, antenna 156 may be a traditional cellular telephone short whip antenna, or may be some form of inevident antenna. If an inevident antenna is desired, a decal thin film semi-concealed antenna may be placed on the interior glass of the vehicle in an inobvious fashion. Alternatively, the entertainment antenna may be used with a suitable signal splitter similar to that described above with regard to Loran C receiver 54. A UART 158 may also be provided to facilitate communication between processor 18 and modem 152 via serial line 160.

Now that the various components of presently preferred embodiments of the reporting apparatus have been described, reference will now be made particularly to the state diagram of FIG. 8 and to FIGS. 2–7 as necessary to describe the operation of the two state alarm which may be implemented by processor 18. A situation in which the vehicle is parked with the alarm disarmed is illustrated in oval 162. In this case, red LED 142 will not be illuminated. Green LED 144, on the other hand, will be blinking. No call will be initiated via communicator 32 to the remote monitoring site and no conspicuous alarm indicators will be actuated. As shown at oval 164, activation of the vehicle ignition will cause green LED 144 to steadily illuminate. Otherwise, no changes occur. However, as shown at oval 166, depression of arm/disarm button 44 will cause red LED 142 to steadily illuminate while green LED 144 will be blinking. This indicates a running, armed status. As shown at oval 168, either deactivating the ignition when the status is running, armed or depressing arm/disarm button 44 when the vehicle is parked, disarmed will initiate a delay, or "timeout". During this timeout period, which may, for example, be 30 seconds, red LED 142 will be blinking, while green LED 144 will not be illuminated. At the expiration of this timeout period, the alarm may enter a parked, armed status as indicated at oval 170. In this situation, red LED 142 will be steadily illuminated, while green LED 144 will not be illuminated. A subsequent depression of arm/disarm button 44 will return the alarm to the parked, disarmed status as indicated at oval 162.

As described above, a first depression of panic button 38 or the panic button on portable device 40 will initiate the silent state of the two state alarm. As indicated at oval 172, this will occur regardless of the previous status. In the silent state, both red LED 142 and green LED 144 will be steadily illuminated. There will be no conspicuous alarm indicators, but the reporting device will initiate communication with the remote monitoring site. As shown at oval 174, a second depression of panic button 38 or the panic button on portable device 40 will cause the alarm to enter the conspicuous state. In this state, both red LED 142 and green LED 144 will be blinking. Communication with the remote monitoring site will continue and the conspicuous alarm indicators, such as siren device 28a and strobe lamp 28b will be actuated. The conspicuous alarm state indicated at oval 134 can also be initiated by ignition switch detector 48 and open door detector 50, assuming the timeout period has expired. Alarm states are exited by subsequent depression of arm/disarm button 44.

The primary components which may be included within the facility at the remote monitoring site are illustrated in FIG. 9. As stated above, it is contemplated that the system will be capable of monitoring a plurality of vehicles, each of which are equipped with an appropriate reporting apparatus. The reporting apparatus on each of the vehicles has stored therein a preselected telephone number corresponding to the remote monitoring facility. Preferably, this telephone number will be a toll-free number from the perspective of the vehicle operator.

As shown, the remote monitoring facility includes a central computer 176. Computer 176 is connected to a plurality of modems 178a–d corresponding to the number of incoming lines. If one of the lines is busy, a call received from a vehicle will be automatically "bounced" to another line which is not busy. If all lines are busy, computer 176 may be programmed to automatically hang up on the oldest call so that at least one line will then be available. The reporting apparatus on each vehicle may be programmed to automatically redial if connection with computer 176 is interrupted.

A terminal 180, which may display an image such as image 10 shown in FIG. 1, is also provided. Optionally, location coordinates of the vehicle may be displayed in numeric form along with other data indicative of the particular vehicle. If a map image is desired, appropriate map data may be stored on a CD-ROM within CD-ROM reader 182. Preferably, such CD-ROM may have map data of many cities or regions of the world. An emergency standby power system 184 may also be provided to assure that the facility continues to operate during temporary power outages.

Preferably, computer 176 would include in its memory the facsimile telephone numbers for all of the law enforcement personnel who are expected to be contacted. In this manner, computer 176 may automatically send such law enforcement personnel a facsimile of the map image utilizing fax modems, such as fax modems 186a–b. Alternatively, bare location data may be digitally transferred to the law enforcement personnel. In this case, the same map image displayed on terminal 180 may be drawn in front of the radio dispatcher if the law enforcement facility is equipped with the proper apparatus. Finally, the operator could simply call the law enforcement personnel and describe to them verbally the movements of the vehicle.

As stated above, the two-way nature of cellular communication permits computer 176 to send messages back to processor 18. As indicated in oval 174 of FIG. 8, one such message may be a preselected alarm signal which automatically places the two state alarm into the conspicuous state. In effect, virtually anything which could be done by the electronics in the vehicle could also be done remotely.

If the police chase car has the capability of a digital data link via cellular telephone or police radio, the map image may be actually displayed in the chase car. It should be noted that the practicality of transferring the map image over a narrow band radio link is affected by the slow data transfer rates allowed on such radio links. It may take many minutes to send a full screen of graphic data over a cellular telephone link. However, if the same software were available in the chase car as at the remote monitoring facility, the map image could be generated locally with only the bare location data being transmitted over the link. This latter scheme is very practical and would provide the officers chasing the alarm vehicle with real time position, trajectory and velocity data. In some circumstances, it may be desirable to equip the police chase car with a directional receiver to locate the carrier signal of phone 154. This may be helpful, for example, if the vehicle is in a building or otherwise not visible from another vehicle.

Figure 10A:
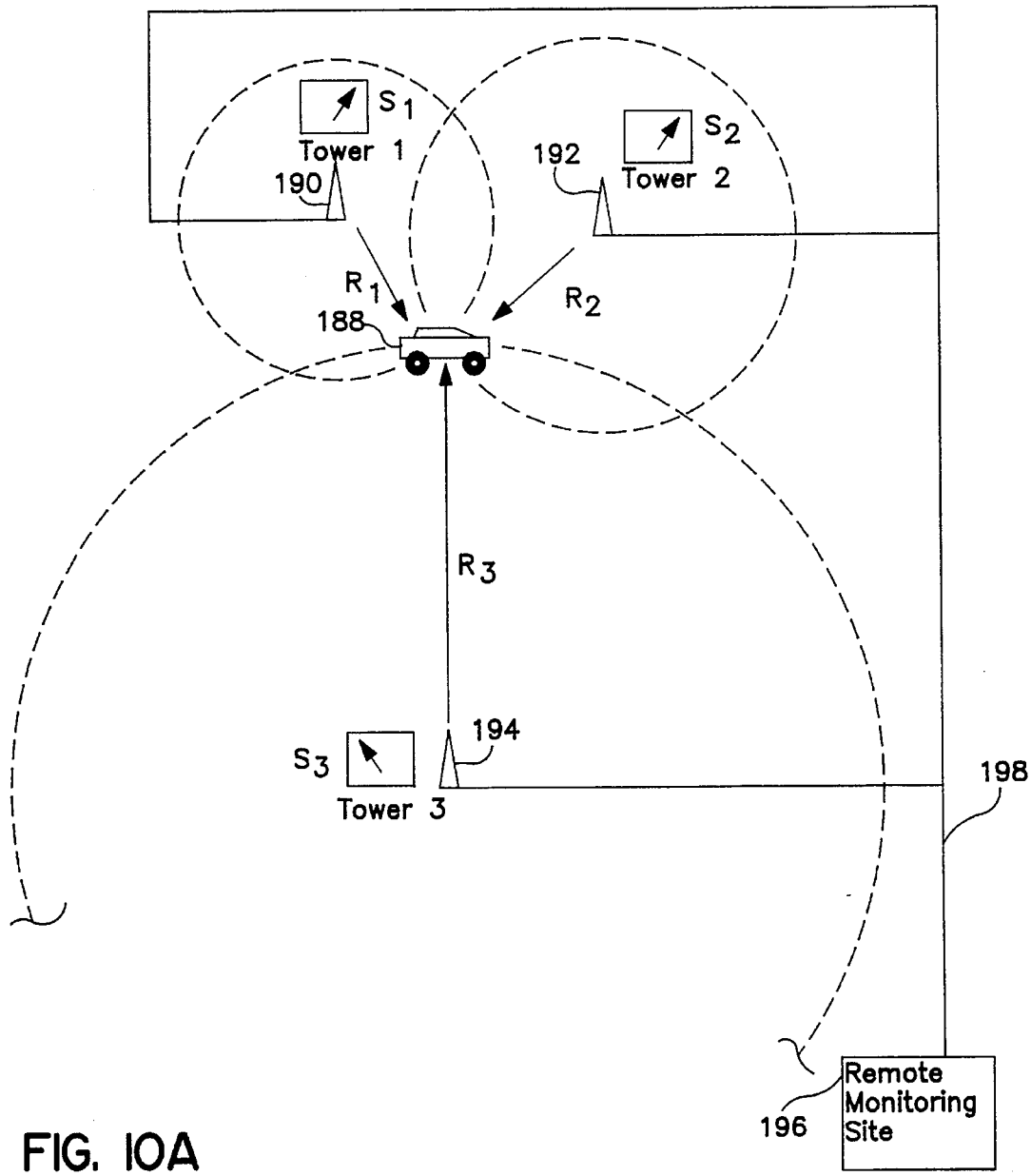

An additional advantage of the use of a cellular telephone network to facilitate communication between the reporting apparatus and the remote monitoring facility is described with reference to FIGS. 10A and 10B. Specifically, the location of a vehicle, such as vehicle 188, may be determined by using field strength measurements of the carrier signal broadcast by cellular telephone 154. This requires that the cellular telephone network recognize the particular call as a communication to the remote monitoring site denoting that a crisis situation has occurred. Operators of such networks, however, already utilize similar technology to recognize the mobile phone and decode the number being dialed to facilitate billing of airtime charges. Additionally, field strength measurements are made at several towers to determine when to switch "cells". As such, it is not believed that additional equipment would be necessary for this purpose.

To determine the location of vehicle 188 according to the invention, field strength data from at least three of the network receiver towers, such as towers 190, 192, 194, must be obtained. The short term effects of signal fading are minimized by averaging the field strength data with a standard low pass filter design before it is utilized to calculate location. This data may then be utilized by the operator of the cellular telephone network to determine vehicle location, if desired. Often, however, bare field strength data will be sent to the remote monitoring site 196 via land-based telephone lines, such as telephone line 198.

Whether the location of vehicle 188 is determined by the operator of the cellular telephone network or at the remote monitoring site 196, the methodology is substantially the same, and will now be described. Given the assumption that the radiation pattern of the mobile transmit antenna mounted on vehicle 188 is omnidirectional, it is practical to compute the position of the vehicle knowing only the receive antenna patterns and receive field strengths at three or more tower sites (such as towers 190, 192, 194). Referring particularly to FIG. 10B, the field strength of the signal received from the vehicle at the ith tower is $$S_i = k^* G_i(\theta_i)/R_i^2 \quad (1)$$

$$R_i = \sqrt{[k^* G_i(\theta_i)/S_i]} \quad (2)$$

where $S_i$ is the receive field strength at the respective tower location, k is the product of the transmit power and antenna gain, $G_i$ is the respective receive antenna gain, and $R_i$ is the distance between the transmitter and the respective receiver antenna. In general, $G_i$ is a function of the direction angle $\theta_i$.

In equation (2), k is unknown, $\theta_i$ is unknown, $G_i$ is measured, and $S_i$ is measured. Therefore, a full solution for i tower locations involves a set of i (typically 3) equations of the form in equation (2) which express distances from the towers to the vehicle in terms of only the unknown direction angles and vehicle transmit field strength. The full set of simultaneous equations required to find the position analytically is difficult to solve in closed form, but a numerical solution may be utilized. Specifically, a multi-variable search may be performed to minimize the distance among the tips of two dimensional radius vectors emanating from each tower location.

A numerical solution may be obtained by a search method. The combined distances between the tips of radius vectors $R_i$ from each tower (at respective locations $t_{xi}, t_{yi}$) may be expressed as a "cost" in the form of a sum of a square of the distances, $d_i$, between respective of vectors $R_i$. In the case of three towers, this is given by $$\text{cost} = d_1^2 + d_2^2 + d_3^2 \quad (3)$$

where $$d_i^2 = (x_j - x_i)^2 + (y_j - y_i)^2 \quad (4)$$

$$x_i = R_i \cos(\theta_i) + t_{xi} \quad (5)$$

$$y_i = R_i \sin(\theta_i) + t_{yi} \quad (6)$$

$d_1$, $d_2$, and $d_3$ are the distances between the tips which are computed from the direction angles (the adjacent tower is designated j). The expression for $R_i$ in Equation (2) may then be substituted into Equation (4) to produce an expression of cost in terms of the direction angles and k, as follows $$d_i^2 = (R_j \cos(\theta_j) - R_i \cos(\theta_i))^2 + (R_j \sin(\theta_j) - R_i \sin(\theta_i))^2 \quad (7)$$

Cost may then be minimized by adjusting the direction angles and k. In reality, k is a redundant variable and does not substantially affect the solution. In fact, k would cancel out entirely in a closed form solution. In a numerical solution, the magnitude of k only affects the final magnitude of cost and not final computed vehicle position.

A numerical search solution may be obtained by a Monte Carlo technique which is substantially random or utilizing more complex methods of steepest descent using numerically determined gradient (multidimensional downhill slope direction) information to direct successive iterations. In either case, the cost is repeatedly computed using different values for the direction angles until a minimum for cost is obtained. Once the minimum cost is obtained with a reasonable accuracy, the position of the vehicle is placed at the center of a circle 200 sharing the three vector tips on its circumference.

Position uncertainty utilizing this method is most strongly affected by the receiver antenna gain calibration accuracy, departure from omnidirectionality of the transmit antenna and anomalous attenuation factors in the transmission paths such as buildings and hills. Even with all these factors considered, the accuracy is always better that the three mile spacing between towers. For example, if the vehicle antenna is perfectly omnidirectional, and there are no obstructions to line of site reception at each tower, a 1 dB field strength error would produce a vehicle position error on the order of 12% of the mean spacing between antennas. For a three mile spacing, the error would be 1900 feet in this case.

To justify this accuracy, consider that 1 dB as a power ratio is 1.26:1 since dB(power)=10*log(P2/P1). The receive power varies as the inverse square of the distance such that $$p_2/p_1 = R_1^2/R_2^2 \quad (8)$$

The 1 dB power ratio therefore becomes the square root 1.26 when expressed in terms of the transmit/receive antenna separation. The square root of 1.26 is approximately 1.12, meaning there is a 12% error in the position relative the tower showing a 1 dB field strength error. Very conveniently, as the number of receive towers increases, the overall position error decreases. Three towers may be used as a minimum, but there is no maximum number except as dictated by the computer power used to solve the minimization problem. Furthermore, as the vehicle travels about the terrain bounded by several towers, the range errors tend to average themselves out.

Location determinations from field strength measurements may be utilized by computer 176 as an additional check on the location information obtained from the vehicle. Alternatively, the field strength method may be utilized in lieu of reported location information. If this method is utilized in lieu of reported location information, the reporting apparatus may be constructed without the location determination devices. As such, an installation utilizing this configuration may be the least expensive to install in the vehicle.

Although a location calculated from field strength measurements is not likely to be as accurate as that determined according to Loran C or GPS, it is nevertheless sufficiently accurate to find a stolen or carjacked vehicle. This is especially true if the siren device and strobe lamp on the vehicle are actuated.

It can thus be seen that the invention provides a vehicle monitoring system for effectively facilitating the efforts of law enforcement personnel and the like to respond to a crisis situation. The system provides many advantages in comparison with the prior art, as has been demonstrated. A novel method of determining the location of a vehicle has also been provided. The invention may include many modifications and variations to the presently preferred embodiments as may be desirable or expeditious in particular applications. Such modifications and variations to the present invention may be recognized by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to be limitative of the invention so further described in such appended claims.

What is claimed is:

1. Reporting apparatus carried on-board a vehicle to facilitate monitoring of the vehicle at a remote monitoring site during a crisis situation, said reporting apparatus comprising:

input means for denoting occurrence of the crisis situation, said input means including at least one panic actuator selectively actuatable to initiate a first silent state and a second conspicuous state;

location determination means for determining a current location of the vehicle;

alarm indicator means for conspicuously indicating occurrence of the crisis situation;

communicator means for providing communication with the remote monitoring site during the crisis situation;

system processor means operatively connected to said input means and said location determination means for initiating communication with the remote monitoring site via said communicator means and providing selected status information thereto, the selected status information including information indicative of the current location of the vehicle; and said system processor means being further operative to selectively implement an alarm based on an input received from said panic actuator having said first silent state during which said selected status information is transmitted to said remote monitoring site without said alarm indicator means being conspicuously activated and said second conspicuous state during which the selected status information is provided to the remote monitoring site and said alarm indicator means are conspicuously activated.

2. Reporting apparatus as in claim 1, further comprising stoppage means operatively responsive to said system processor means for facilitating stoppage of the vehicle during the second conspicuous state.

3. Reporting apparatus as in claim 2, wherein said stoppage means includes means for interrupting operation of an engine of the vehicle.

4. Reporting apparatus as in claim 2, wherein said system processor means is further operative upon receipt via said communicator means of a preselected alarm signal from said remote monitoring site to implement said second conspicuous state.

5. Reporting apparatus as in claim 1, further comprising intrusion detector means operatively connected to said system processor means for denoting unauthorized intrusion of the vehicle.

6. Reporting apparatus as in claim 5, wherein said intrusion detector means comprises an ignition switch detector and an open door detector.

7. Reporting apparatus as in claim 1, wherein said at least one panic actuator includes at least one panic button depressible a first time to initiate the first silent state and depressible a second time to initiate the second conspicuous state.

8. Reporting apparatus as in claim 7, wherein said at least one panic button includes an on-board panic button mountable in the vehicle and a portable panic button device carried on a key chain.

9. Reporting apparatus as in claim 1, wherein said location determination means includes at least one receiver device operative to receive selected radio signals from which location of the vehicle may be determined.

10. Reporting apparatus as in claim 9, wherein said communicator means includes a mobile telephone operative to communicate with the remote monitoring site via a telephone network.

11. Reporting apparatus as in claim 10, wherein said location determination means further includes inertial means operatively connected to the system processor means for producing selected inertial information from which location of the vehicle may be determined.

12. Reporting apparatus as in claim 9, wherein said at least one receiver device includes a Loran receiver operative to receive RF signals broadcast by land-based Loran transmitters and responsively outputs coordinate information indicative of the location of the vehicle.

13. Reporting apparatus as in claim 12, wherein said location determination means further includes a signal splitter network electrically connectible interposing said Loran receiver and an entertainment radio antenna of the vehicle, said Loran receiver thereby operative to receive the RF signals broadcast by the land-based Loran transmitter utilizing the entertainment radio antenna.

14. Reporting apparatus as in claim 13, wherein said signal splitter network is configured to pass signals having a frequency of below approximately 200 kHz to said Loran receiver and signals having a frequency of greater than approximately 200 kHz to an entertainment radio of the vehicle.

15. Reporting apparatus as in claim 12, wherein said location determination means further includes a concealable antenna operatively connected to said Loran receiver to facilitate receipt of the RF signals, said concealable antenna including a pair of ferrite coil antennas situated substantially at right angles to one another.

16. Reporting apparatus as in claim 9, wherein said at least one receiver device includes a GPS receiver operative to receive RF signals broadcast by satellite-based global positioning system transmitters and responsively outputs coordinate information indicative of the location of the vehicle.

17. Reporting apparatus as in claim 16, wherein said location determination means further includes a disc-shaped antenna electrically connected to said GPS receiver and mounted flush with a roof of the vehicle.

18. Reporting apparatus as in claim 1, wherein said alarm indicator means includes a siren device and a strobe lamp.

* * * * *